United States Patent [19]
Henrick et al.

[11] 3,821,269
[45] June 28, 1974

[54] THIOLESTERS OF 3-HYDROXY-3,7,11 SUBSTITUTEDTHIOL DODECEMOATES OR UNDECENOATES

[75] Inventors: Clive A. Henrick; John B. Siddall, both of Palo Alto, Calif.

[73] Assignee: Zoecon Corporation, Palo Alto, Calif.

[22] Filed: Dec. 18, 1972

[21] Appl. No.: 316,305

[52] U.S. Cl.............. 260/455 R, 260/593, 424/361
[51] Int. Cl................................. C07c 153/07
[58] Field of Search................................ 260/455 R

[56] References Cited
OTHER PUBLICATIONS
Chem. Abstracts, Vol. 74:99450j, Siddall March 4, 1971.

*Primary Examiner*—Lewis Gotts
*Assistant Examiner*—D. R. Phillips
*Attorney, Agent, or Firm*—Donald W. Erickson; Lee-Louise H. Priest

[57] ABSTRACT

Aliphatic β-hydroxy olefinic thiolesters, synthesis thereof, which are useful intermediates and insect control agents of the formula

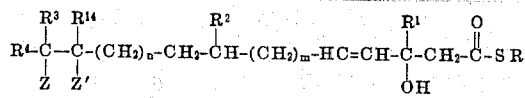

wherein, each of R, $R^1$, $R^2$, $R^3$ and $R^4$ is lower alkyl; $R^{14}$ is hydrogen or methyl; $m$ and $n$ is zero, one or two; Z, when taken separately, is hydrogen, lower alkyl, lower alkoxy or lower alkylthio; Z', when taken separately, is hydrogen; and Z and Z', when taken together, form a carbon-carbon bond.

10 Claims, No Drawings

THIOLESTERS OF 3-HYDROXY-3,7,11 SUBSTITUTEDTHIOL DODECEMOATES OR UNDECENOATES

This invention relates to novel aliphatic mono- and di-olefinic compounds, intermediates therefor, synthesis thereof and the control of insects. More particularly, the novel olefinic compounds of the present invention are represented by the following formula:

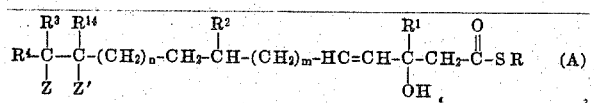

wherein,
each of R, $R^1$, $R^2$, $R^3$ and $R^4$ is lower alkyl;
$R^{14}$ is hydrogen or methyl;
each of $m$ and $n$ is zero or the positive integer 1 or 2;
Z when taken separately, is hydrogen, lower alkyl, lower alkoxy or lower alkylthio;
Z' when taken separately, is hydrogen; and
Z and Z' when taken together, form a carbon-carbon bond.

The compounds of formula A are useful for the control of insects. The utility of these compounds as insect control agents is believed to be attributable to their juvenile hormone activity. They are preferably applied to the immature insect, namely, during the embryo, larvae or pupae stages in view of their effect on metamorphosis and otherwise causing abnormal development leading to death or to inability to reproduce. These compounds are effective control agents for *Heteropterans*, such as *Lygaeidae*, *Miridae* and *Pyrrhocoridae*; *Homopterans*, such as *Aphididae*, *Coccidae* and *Jassidae*; *Lepidopterans*, such as *Pyralidae*, *Noctuidae* and *Gelechiidae*; *Coleopterans*, such as *Tenebrionidae*, *Crysomelidae* and *Dermestidae*; *Dipterans*, such as *Culicidae*, *Muscidae* and *Sarcophagidae*; and other insects. The compounds can be applied at low dosage levels of the order of 0.01 ug. to 10 ug. per insect. Suitable carrier substances include liquid or solid inert carriers, such as water, acetone, xylene, mineral or vegetable oils, talc, vermiculite, natural and synthetic resins and silica. Treatment of insects in accordance with the present invention can be accomplished by spraying, dusting or otherwise contacting the insect, directly or indirectly, with one or more compounds of formula. Generally, a concentration of less than 25% of the active compound is employed. The formulations can include insect attractants, emulsifying agents or wetting agents to assist in the application and effectiveness of the active ingredient.

In the description hereinafter each of R–$R^4$, $R^{14}$, Z–Z', $m$ and $n$ is as defined above, unless otherwise specified.

The compounds of the present invention can be prepared as outlined below:

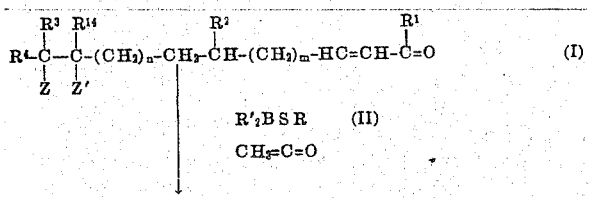

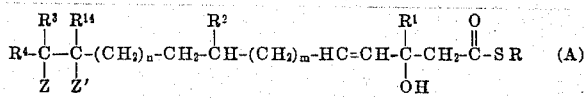

In the above formulas, R' is lower alkyl.

In the practice of the above outlined synthetis, a ketone of formula I is reacted with a thioboronite of formula II and ketene to prepare a compound of formula A. The reaction can be carried out in a solvent inert to the reaction such as ether, tetrahydrofuran, diglyme and the like, at a temperature of about 0°. The thus formed intermediate complex is then hydrolyzed at room temperature to yield the B-hydroxythiolester of formula A. See T. Mukaiyama and K. Inomata, *Bull. Chem. Soc. Japan*, 44, 3215 (1971).

The ketones of formula I can be prepared as described in application Ser. No. 187,897, filed Oct. 8, 1971, now U.S. Pat. No. 3,755,411; application Ser. No. 187,898, filed Oct. 8, 1971, now U.S. Pat. No. 3,752,843 and application Ser. No. 256,605, filed May 24, 1972, the disclosures of which are incorporated by reference. As described in Ser. No. 256,605, ketones of formula I wherein Z is lower alkylthio can be prepared, for example, by reaction of an aldehyde such as 7-methylthio-3,7-dimethyloctan-1-al with an ylid reagent such as triphenylphosphineacetylmethylene.

The term "lower alkyl", as used herein, refers to a straight or branched chain saturated aliphatic hydrocarbon group having a chain length of one to six carbon atoms, e.g. methyl, ethyl, propyl, i-propyl, n-butyl, s-butyl, t-butyl, pentyl and hexyl.

In addition to the compounds of the present invention having activity useful for the control of insects, the compounds of formula A can be utilized as intermediates for forming C-2,4 diunsaturated compounds, which are useful insect control agents in the same way as the compounds of formula (A).

The following examples are provided to illustrate the practice of the present invention. Temperature is given in degrees Centigrade.

EXAMPLE 1

A solution of 3.25 g. of ethyl diethyl thioboronite (II, R=R'=ethyl) and 4.9 g. of 6,10-dimethylundec-3-en-2-one in 75 ml. dry ether is treated with ketene at 0° for 2 hours. After removal of the ether, the mixture is hydrolyzed with a solution of hydrogen peroxide in aqueous methanol at room temperature. After stirring overnight, the methanol is evaporated in vacuo and the residue extracted with ether. The ethereal extracts are washed with 5 percent aqueous sodium bicarbonate, water and brine, and dried over sodium sulfate. Evaporation of the solvent yields ethyl 3-hydroxy-3,7,11-trimethylthioldodec-4-enoate.

EXAMPLE 2

Following the procedure of Example 1 6,10-dimethylundec-3-en-2-one is reacted with ketene and one equivalent of ethyl di-n-butylthioboronite (II, R=ethyl, R'=n-butyl) to prepare ethyl 3-hydroxy-3,7,11-trimethylthioldodec-4-enoate.

Similarly ethyl 3-hydroxy-3,7,11-trimethylthioldodec-4-enoate is prepared from 6,10-dimethylundec-3- en-2-one, ketene and one equivalent of an ethyl dialkylthioboronite such as ethyl dipropylthioboronite, ethyl dihexylthioboronite, etc..

EXAMPLE 3

Each of the ketones under Column I is reacted with ketene and ethyldialkyl thioboronite using the procedure of Example 1 or Example 2 to prepare the respective 3-hydroxy thiolesters under Column II.

COLUMN I 10-methoxy-6,10-dimethylundec-3-en-2-one;
10-methylthio-6,10-dimethylundec-3-en-2-one;
6,10,10-trimethylundec-3-en-2one;
6,10-dimethyldodec-3-en-2-one;
6,10-dimethylundec-3,9-dien-2-one;
6,9,10-trimethylundec-3-en-2-one;
10-methoxy-6,9,10-trimethylundec-3-en-2-one;
9-methoxy-6,9-dimethyldec-3-en-2-one;
9-methoxy-6,8,9-trimethyldec-3-en-2-one;
6,8,9-trimethyldec-3-en-2-one; and
6,9-dimethyldec-3-en-2-one.

COLUMN II ethyl 3-hydroxy-11-methoxy-3,7,11-trimethylthioldodec-4-enoate;
ethyl 3-hydroxy-11-methylthio-3,7,11-trimethylthioldodec-4-enoate;
ethyl 3-hydroxy-3,7,11,11-tetramethylthioldodec-4-enoate;
ethyl 3-hydroxy-3,7,11-trimethylthioltridec-4-enoate;
ethyl 3-hydroxy-3,7,11-trimethylthioldodeca-4,10-dienoate;
ethyl 3-hydroxy-3,7,10,11-tetramethylthioldodec-4-enoate;
ethyl 3-hydroxy-11-methoxy-3,7,10,11-tetramethylthioldodec-4-enoate;
ethyl 3-hydroxy-10-methoxy-3,7,10-trimethylthiolundec-4-enoate;
ethyl 3-hydroxy-10-methoxy-3,7,9,10-tetramethylthiolundec-4-enoate;
ethyl 3-hydroxy-3,7,9,10-tetramethylthiolundec-4-enoate; and
ethyl 3-hydroxy-3,7,10trimethylthiolundec-4-enoate.

EXAMPLE 4

By reacting 6,10-dimethylundec-3-en-2-one with ketene and one equivalent of butyl di-n-butyl thioboronite (II, R=R'=n-butyl) or butyl dialkyl thioboronite according to the procedure of Example 1, n-butyl 3-hydroxy-3,7,11-trimethylthioldodec-4-enoate is prepared.

By repeating the process of this example using other thioboronites such as methyl di-n-butyl thioboronite, i-propyl di-i-propyl thioboronite and hexyl di-hexylthioboronite the corresponding methyl 3-hydroxy-3,7,11-trimethylthioldodec-4-enoate, i-propyl 3-hydroxy-3,7,11,-trimethylthioldodec-4-enoate, and hexyl 3-hydroxy-3,7,11-trimethylthioldodec-4-enoate are prepared.

Other esters of the present invention of formula A are prepared by use of the process of Example 1 using a ketone of Column I with an alkyl dialkyl thioboronite of formula II such as butyl di-n-butyl thioboronite, methyl di-n-butylthioboronite and the like in place of ethyl diethyl thioboronite. Thus there is prepared methyl 3-hydroxy-3,7,11-trimethylthioldodeca-4,10-dienoate, n-butyl, 3-hydroxy-11-methoxy-3,7,11-trimethylthioldodec-4-enoate, n-butyl 3-hydroxy-3,7,11-trimethylthioltridec-4-enoate, etc.

EXAMPLE 5

To a solution of 250 mg of ethyl 3-hydroxy-3,7,11-trimethylthioldodec-4-enoate in 5 ml of dry pyridine is added, at 0°, under nitrogen, 125 mg of phosphorous oxychloride. The reaction mixture is allowed to stir at room temperature during 4 days and is then poured into cold 10 percent aqueous hydrochloric acid and extracted with ether. The organic extracts are washed with water, aqueous sodium bicarbonate, brine and water, dried over calcium sulfate and evaporated to give ethyl 3,7,11-trimethylthioldodeca-2,4-dienoate which can be purified by chromatography and distillation.

EXAMPLE 6

The 3-hydroxythiolesters under Column II of Example 3 are converted using the procedure of Example 5 to the corresponding 2,4-dienoates under Column III.

COLUMN III ethyl 11-methoxy-3,7,11-trimethylthioldodeca-2,4-dienoate;
ethyl 11-methylthio-3,7,11-trimethylthioldodeca-2,4-dienoate;
ethyl 3,7,11,11-tetramethylthioldodeca-2,4-dienoate;
ethyl 3,7,11-trimethylthioltrideca-2,4-dienoate;
ethyl 3,7,11-trimethylthioldodeca-2,4,10-trienoate;
ethyl 3,7,10,11-tetramethylthioldodeca-2,4-dienoate;
ethyl 11-methoxy-3,7,10,11-tetramethylthioldodeca-2,4-dienoate;
ethyl 10-methoxy-3,7,10-trimethylthioldodeca-2,4-dienoate;
ethyl 10-methoxy-3,7,9,10-tetramethylthiolundeca-2,4-dienoate;
ethyl 3,7,9,10-tetramethylthiolundeca-2,4-dienoate; and
ethyl 3,7,10-trimethylthiolundeca-2,4-dienoate.

What is claimed is:

1. A compound selected from those of formula

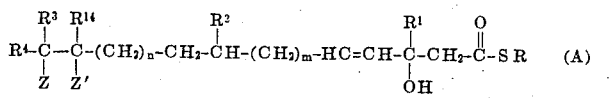

(A)

wherein,
each of $R^1$, $R^2$, $R^3$ and $R^4$ is methyl or ethyl;
R is lower alkyl;
$R^{14}$ is hydrogen or methyl;
m is the positive integer 1; n is 0 or the positive integer 1;
Z, when taken separately, is hydrogen, lower alkyl, lower alkoxy or lower alkylthio;
Z', when taken separately, is hydrogen; and
Z and Z' when taken together form a carbon-carbon bond.

2. A compound of claim 1 wherein Z' is hydrogen and Z is hydrogen, methyl, methoxy, ethoxy, methylthio, or ethylthio.

3. A compound according to claim 2, wherein $R^{14}$ is hydrogen and each of $R^1$, $R^2$ and $R^3$ is methyl.

4. A compound according to claim 3, wherein n is one.

5. A compound according to claim 1 wherein Z taken together with Z' forms a carbon-carbon bond.

6. A compound according to claim 5 wherein $R^{14}$ is hydrogen; $R^1$, $R^2$ and $R^3$ is each methyl.

7. A compound according to claim 6 wherein n is one.

8. The counpound, ethyl 3-hydroxy-3,7,11-trimethylthioldodec-4-enoate, according to claim 1.

9. The compound, ethyl 3-hydroxy-11-methoxy-3,7,11-trimethylthioldodec-4-enoate, according to claim 1.

10. The compound, ethyl 3-hydroxy-10-methoxy-3,7,10-trimethylthiolundec-4-enoate, according to claim 1.

* * * * *